(12) United States Patent
Müller et al.

(10) Patent No.: US 9,038,492 B2
(45) Date of Patent: May 26, 2015

(54) HYDRAULIC ARRANGEMENT FOR ACTUATING A PLURALITY OF SHIFT RAILS

(75) Inventors: Eric Müller, Kaiserslautern (DE); Reinhard Stehr, Bühl (DE); Roshan Willeke, Bühl (DE); Ronald Glas, Obersasbach (DE); Martin Staudinger, Ettlingen (DE); Marco Grethel, Bühlertal (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 233 days.

(21) Appl. No.: 13/452,862

(22) Filed: Apr. 21, 2012

(65) Prior Publication Data

US 2012/0272769 A1    Nov. 1, 2012

(30) Foreign Application Priority Data

Oct. 23, 2009 (DE) .......................... 10 2009 050 552
Dec. 14, 2009 (DE) .......................... 10 2009 058 250

(51) Int. Cl.
*F16H 61/28* (2006.01)
*F16H 61/688* (2006.01)

(52) U.S. Cl.
CPC .......... *F16H 61/2807* (2013.01); *F16H 61/688* (2013.01)

(58) Field of Classification Search
USPC ................................ 74/330, 335, 473.11, 346
See application file for complete search history.

(56) References Cited

U.S. PATENT DOCUMENTS

| | | | |
|---|---|---|---|
| 6,941,912 B2 * | 9/2005 | Palesch et al. | 123/90.17 |
| 7,300,375 B2 * | 11/2007 | Petrzik | 475/119 |
| 7,347,117 B2 * | 3/2008 | Nassif | 74/335 |
| 8,206,265 B2 * | 6/2012 | Maten et al. | 477/130 |
| 8,225,687 B2 * | 7/2012 | Lundberg et al. | 74/330 |
| 8,359,941 B2 * | 1/2013 | Lundberg et al. | 74/340 |
| 8,429,994 B2 * | 4/2013 | Lundberg et al. | 74/335 |
| 2006/0046897 A1 | 3/2006 | Mohlmann et al. | 477/143 |
| 2009/0065322 A1 | 3/2009 | Dreher et al. | 192/87.18 |

FOREIGN PATENT DOCUMENTS

EP          1 400 733 A2        3/2004

* cited by examiner

*Primary Examiner* — William C Joyce
(74) *Attorney, Agent, or Firm* — Alfred J. Mangels

(57) ABSTRACT

A hydraulic arrangement by which a plurality of shift rails of a transmission are actuated, including one double acting cylinder per shift rail by which the respective shift rail can be moved back and forth. A first hydraulic valve is connected upstream of the plurality of shift rails and has a first output and a second output, by which a first shift pressure and a second shift pressure for actuating the shift rails can be provided. A second hydraulic valve is connected between the first hydraulic valve and two of the shift rails, and by which it is selectively possible for the first output of the first hydraulic valve to be associated with one of the double acting cylinders of the two shift rails, and the second output of the first hydraulic valve to be associated with the other double acting cylinder of the two shift rails.

10 Claims, 2 Drawing Sheets

HYDRAULIC ARRANGEMENT FOR ACTUATING A PLURALITY OF SHIFT RAILS

BACKGROUND OF THE INVENTION

1. Field of the Invention

The present invention relates to a hydraulic arrangement by which a plurality of so shift rails of a transmission, in particular a double clutch transmission, can be actuated, the arrangement including one double acting cylinder per shift rail by which the respective shift rail can be actuated to move back and forth.

2. Description of the Related Art

Hydraulic arrangements for hydraulically controlling and supplying a is transmission are known. In automatic transmissions like, e.g., shift transmissions, CVT transmissions, or dual clutch transmissions with hydraulic control, this means that for actuator control, like clutch actuator- or shift actuator control and cooling-/lubrication an oil supply (typically a pump with a pump drive) is required.

Typically, the pump drive is a mechanical pump drive that is coupled to the internal combustion engine. In modern transmissions, this mechanical pump drive can be supplemented with an E-pump arrangement (this means an electric motor with a pump).

Furthermore, oil supplies are known in which the transmission and clutch actuators operate without a mechanically driven pump. Herein, however, due to the configuration of the clutch (this is a dry clutch), no cooling oil is required.

In dual clutch transmissions, so-called shift rails are used for shifting the gears. The shift rails in order to perform their functions, namely shifting a gear, have to be moveable in both directions along an axis. This movement can be provided, e.g., with hydraulic actuators which have to be hydraulically controlled accordingly. The shift rail can thus have a neutral position in the center of its travel, and can have a shifting position for a gear proximal to the respective ends of the travel.

The hydraulic actuators for moving the shift rails recited above can be configured as single acting cylinders or as double acting cylinders. Two hydraulic operating surfaces are required per shift rail, wherein the operating surfaces are implemented in the cylinders. The hydraulic operating surfaces per shift rail can have either identical sizes or different sizes. Depending on the surface concept, different hydraulic controls are required. Thus, the hydraulic operating surfaces can be arranged in two independent cylinders or in a double acting cylinder.

The operating conditions occurring when controlling the partial transmissions by transmission actuators or shift rails are quite different. Thus, situations with high volume flow and low pressure requirement, as well as situations with high pressure and low volume flow requirement, are provided. During a shifting process, initially a large travel has to be covered at low pressure (this means high volume flow with low pressure), and from the beginning of the synchronization shortly before shifting a gear a small travel with higher resistance has to be covered, which means low volume flow with high pressure has to be covered.

In known arrangements of hydraulic systems for hydraulically controlling a dual clutch transmission with a first partial transmission and a second partial transmission, the operating surfaces of such arrangement are respectively controlled with a valve function group. When a pressure control and a volume control is provided per operating surface, then conventionally eight valves are required for four shift rails, e.g., for eight gears (seven forward gears and one reverse gear). Assemblies are also known which implement this function with five valves or with one valve in the form of a multiplexer (e.g., configured as a rotating valve). These approaches have cost and/or functional disadvantages.

Thus, it is an object of the present invention to provide an improved hydraulic system by which a control of a transmission is provided with as few hydraulic components as possible, in particular a dual clutch transmission.

SUMMARY OF THE INVENTION

The object is achieved by a hydraulic arrangement by which a plurality of shift rails of a transmission, in particular a dual clutch transmission, are controllable with a double acting cylinder per shift rail, by which the respective shift rail is controllable so it is movable back and forth by a first hydraulic valve connected upstream of the plurality of shift rails. The first hydraulic valve includes a first and a second outlet by which a first shifting pressure and a second shifting pressure are generatable for controlling the shift rails. A second hydraulic valve is connected between the first hydraulic valve and two of the shift rails, by which optionally one of the double acting cylinders of the two shift rails is associatable with the first outlet of the first hydraulic valve and the other double acting cylinders of the two shift rails is associatable with the second outlet of the first hydraulic valve, optionally in a crossover pattern.

Advantageously, the first hydraulic valve is configured to generate the shifting pressures required for controlling the shift rails, wherein the shifting pressures are advantageously switchable by the second hydraulic valve to the double acting cylinders, so that the gears or the stages of the transmission are controllable. Advantageously, the two outlets can be arranged either directly or, optionally, in a crossover pattern, so that the combinations necessary for shifting the gears are advantageously provided. In each shifting position of the second hydraulic valve, two shifting pressures can be set by the first hydraulic valve, so that two gears of the transmission are shiftable. Overall, four gears of the transmission are controllable by the two shifting positions of the second hydraulic valve. The shifting pressures can be for example a first higher pressure that is generatable, e.g., by reducing a system pressure and a lower second pressure that is generatable, e.g., by connecting with an unpressurized tank.

In one embodiment of the hydraulic assembly it is provided that the second output of the first hydraulic valve is associated by the second hydraulic valve optionally with a first operating surface of one of the two double acting cylinders of the two shift rails, and, respectively, with a second operating surface of the double acting cylinders, which operates opposite to the first operating surface. Each of the double acting cylinders respectively include a first operating surface and a second operating surface operating opposite to the first operating surface. The second operating surfaces are both identically associated with the second output of the first hydraulic valve. Advantageously, optionally either the first operating surface of the first double acting cylinder or the first operating surface of the second double acting cylinder is also associatable with the second outlet. Advantageously, this facilitates short circuiting the respective double acting cylinder, which is respectively associated with both operating surfaces with the second outlet of the first hydraulic valve, or to switch it powerless in case both operating surfaces have identical sizes. In this case, this is a double acting cylinder with a first and a second operating surface which have identical areas so that the forces cancel each other when loaded with an identical pressure or a hydraulic force balance is established so that the double acting cylinder remains stationary. Advantageously, the respective other double acting cylinder, in which only the second operating surface is connected with the second outlet of the first hydraulic valve, can be loaded with a different pressure on its first operating surface, wherein adjusting or moving the respectively associated shift rail is provided.

It is provided in another embodiment of the hydraulic arrangement that by the second hydraulic valve, additionally optionally, both operating surfaces of the double acting cylinders of the two shift rails are associatable with the second outlet of the first hydraulic valve, and simultaneously both second operating surfaces of the double acting cylinders of the two shift rails are associatable with the second outlet of the first hydraulic valve. Advantageously, a shifting position can be additionally approached by the second hydraulic valve, in which shifting position both first operating surfaces of the double acting cylinders are associated with the second outlet. Additionally, the second operating surfaces of the double acting cylinders are also associated with the second outlet, in particular directly associated, thus without connecting additional hydraulic elements in between. Advantageously, short circuiting both double acting cylinders is possible in this shifting position, wherein none of the two shift rails is actuated. Advantageously, this shifting position can be used in phases in which no gear change of the transmission is required.

In another embodiment of the hydraulic arrangement, it is provided that respectively in front of two of the double acting cylinders for respectively two of the shift rails, an additional hydraulic valve is connected which is configured and connected analogously to the second hydraulic valve. Advantageously, either the second hydraulic valve or one of the additional hydraulic valves can be connected respectively upstream of one of the pair of two double acting cylinders. Thus, advantageously, an unlimited number of pairs of double acting cylinders can be respectively controlled with a hydraulic valve. Thus, it is advantageously feasible to control the respective pair directly, or in a crossover pattern, by optionally connecting the second outlet with the first operating surfaces. The other double acting cylinders connected in pairs are short circuited in a shifting process of this type by the hydraulic valves respectively connected upstream, wherein the respective remaining first and second operating surfaces are respectively all together associated with the second outlet of the first hydraulic valve. Advantageously, the shifting pressures can thus be provided by controlling the first hydraulic valve, which provides the shifting pressures, and the entire transmission can be controlled by the hydraulic valves that are connected upstream to the double acting cylinders that are respectively connected in pairs. The transmission can be, e.g., a dual clutch transmission with a total of four shift rails, wherein the first hydraulic valve, the second hydraulic valve, and one of the additional hydraulic valves are required for control. Thus, advantageously, only three hydraulic valves are required for controlling four shift rails, which can control eight gears overall, e.g., seven forward gears and one reverse gear.

In another embodiment of the hydraulic arrangement, it is provided that the first, the second, and the additional hydraulic valve are configured to be identical. Advantageously, all hydraulic valves can have an identical shifting pattern and can thus be economically produced as identical components in rather large numbers.

In another embodiment of the hydraulic arrangement, it is provided that the first hydraulic arrangement additionally includes two pressure return conduits through which the shifting pressures can be generated. The first hydraulic valve can be advantageously connected with the two pressure returns, wherein the shifting pressures required for controlling the first operating surface and the second operating surface of the respective double acting cylinder are generatable.

In another embodiment of the hydraulic arrangement, it is provided that the first hydraulic valve includes a separate pressure regulation and reduction valve, and a shift valve connected thereafter by which the shift pressures are generatable. It is advantageously feasible to provide by the separate pressure regulation and reduction valve a pressure that is required for loading one of the operating surfaces of the double acting cylinders. By the subsequently connected shift valve, the provided pressure can be optionally associated as a shifting pressure with the first operating surface or with the second operating surface. The respective other surface can be advantageously associated through the shifting valve with a tank of the hydraulic arrangement, or it can thus be switched to an unpressurized condition. Advantageously, the shifting valve can have an identical configuration as the second hydraulic valve or the additional hydraulic valve. Then it is also advantageously possible to switch the two operating surfaces to the tank in a center shifting position.

The object is also achieved by a transmission, in particular a dual clutch transmission with a hydraulic arrangement as described herein. This yields the advantages described above.

BRIEF DESCRIPTION OF THE DRAWINGS

Other advantages features and details can be derived from the following description with reference to the drawing figures, wherein at least one embodiment is described in detail. Described and/or depicted features form the object of the invention by themselves or in any useful combination, possibly also independently from the patent claims and can also form an additional object of one or plural separate applications. Identical, similar, and/or functionally identical components are provided with like reference numerals in the drawing figures, wherein:

DESCRIPTION OF THE PREFERRED EMBODIMENTS

Figure 1:
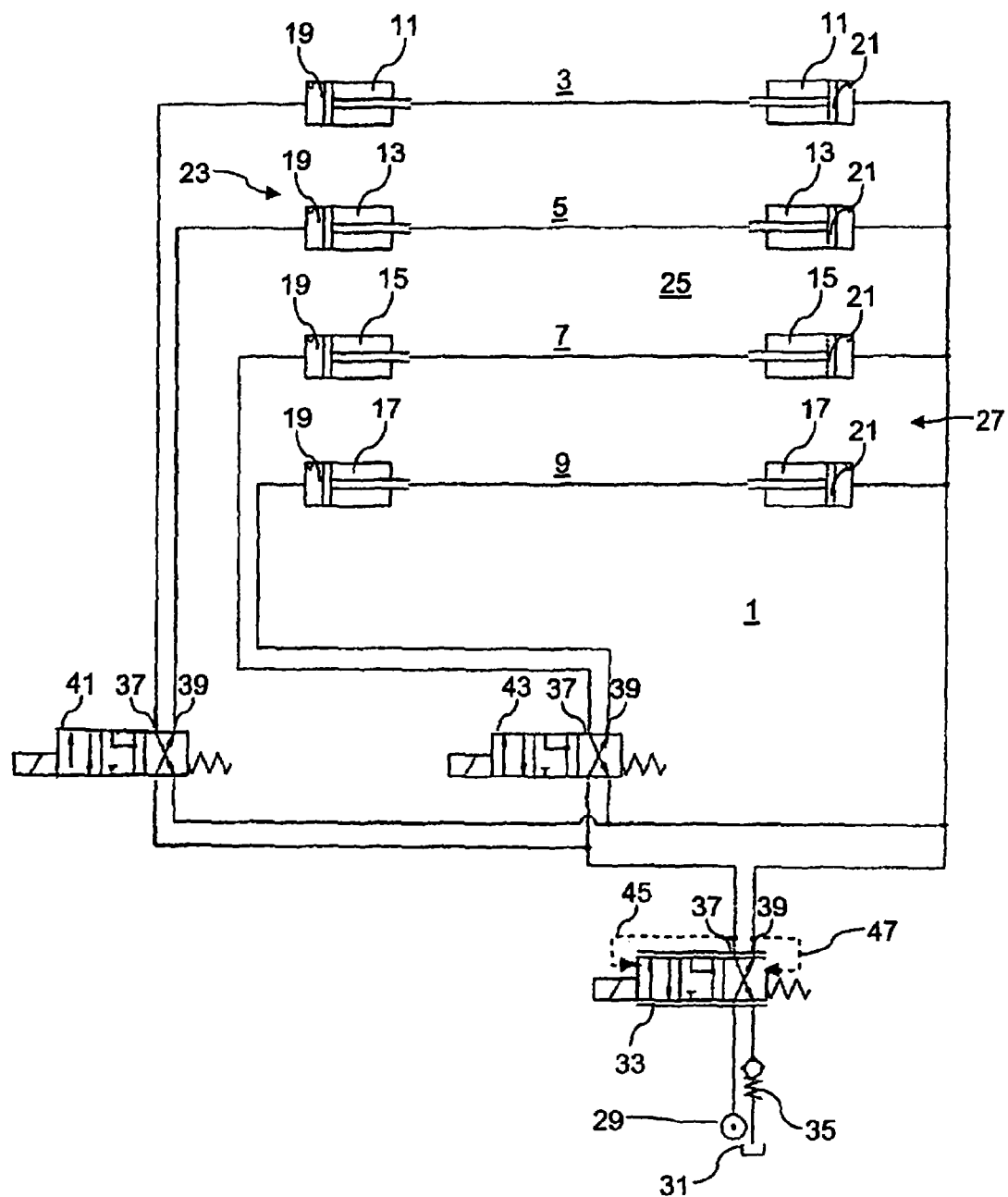
FIG. 1 shows a hydraulic arrangement by which eight gears of a dual clutch transmission are controllable.

FIG. 1 illustrates a hydraulic arrangement 1 by which a first shift rail 3, a second shift rail 5, a third shift rail 7, and a fourth shift rail 9 are controllable. Each of the shift rails 3-9 is associated with a respective double acting cylinder. The first shift rail 3 is associated with a first double acting cylinder 11, the second shift rail 5 is associated with a second double acting cylinder 13, the third shift rail 7 is associated with a third double acting cylinder 15, and the fourth shift rail 9 is associated with a fourth double acting cylinder 17.

Each of the double acting cylinders 11 through 17 includes a respective first operating surface 19 and a respective second operating surface 21. The operating surfaces 19 and 21 of the respective double acting cylinders 11 through 17 have identical surfaces, or act identically, so that a hydraulic force balance is provided at the respective double acting cylinder 11 through 17 when an identical hydraulic pressure is supplied to the first operating surface 19 and to the second operating surface 21.

The first shift rail 3 and the second shift rail 5, and the associated first double acting cylinder 11 and the second double acting cylinder 13, are associated in a first partial transmission 23 of a dual clutch transmission 25, only indicated in FIG. 1 by the reference numeral 25. The first partial transmission 23 of the dual clutch transmission 25 is configured for shifting even numbered gears. The dual clutch transmission 25 includes a second partial transmission 27 by which odd numbered gears are controllable. The second partial transmission 27 is controllable by the third shift rail 7 and the fourth shift rail 9, or the associated third double acting cylinder 15 and the fourth double acting cylinder 17.

In order to provide hydraulic energy or a pressurized hydraulic medium, the hydraulic arrangement 1 includes a hydraulic energy source 29. The hydraulic energy source 29 can be configured, e.g., as mechanically, electrically, and/or a hybrid drivable hydraulic pump. Additionally, the hydraulic arrangement 1 includes a non-pressurized tank 31 into which the hydraulic medium fed by the energy source 29 can flow back. A first hydraulic valve 33 is connected downstream of the hydraulic energy source 29. Between the first hydraulic valve 33 and the tank 31 a check valve 35 is connected which can prevent the subsequently connected hydraulic lines from running empty. The first hydraulic valve 33 includes two inlets, which are respectively associated with the hydraulic energy source 29 and the check valve 35. Furthermore, the first hydraulic valve 33 includes a first outlet 37 and a second outlet 39. The two inlets of the first hydraulic valve 33, in a first shifting position as illustrated in FIG. 1, can be associated with the two outlets 37 and 39 in a crossover pattern. In a second, center shifting position, the hydraulic energy source 29 can be blocked. Furthermore, in the second, center shifting position of the first hydraulic valve 33, the first outlet 37 and the second outlet 39 are both connected with the tank 31 by the check valve 35. In a third shifting position, the two inlets of the first hydraulic valve 33 can also be associated with respective ones of the first outlet 37 and the second outlet 39, directly however, and thus not in a crossover pattern.

The second outlet 39 of the first hydraulic valve 33 is connected upstream of all four double acting cylinders 11 through 17, namely directly associated with all second operating surfaces 21. The hydraulic arrangement 1 includes a second hydraulic valve 41 and a third hydraulic valve 43 which are connected downstream of the first hydraulic valve 33. The hydraulic valves 41 and 43 are connected in parallel, and include two respective inlets, which are respectively connected downstream of the first outlet 37 and the second outlet 39 of the first hydraulic valve 33. The second hydraulic valve 41 and the third hydraulic valve 43 are configured identical to the first hydraulic valve 33, and can also provide three respective shifting conditions. With respect to the shifting conditions, reference is made to the description of the hydraulic valve 33. A first outlet 37 of the second hydraulic valve 41 is connected upstream of the first operating surface 19 of the first double acting cylinder 11. A second outlet 39 of the second hydraulic valve 41 is connected upstream of the first operating surface 19 of the second double acting cylinder 13. Thus, the second hydraulic valve 41 is associated with or connected upstream of the first partial transmission 23, and it is used together with the first hydraulic valve 33 for controlling or shifting the even numbered gears of the first partial transmission of the dual clutch transmission 25.

Analogously thereto, the third hydraulic valve 43 is connected upstream of the second partial transmission 27, or upstream of the third double acting cylinder 15, and the fourth double acting cylinder 17. Thus, a first outlet 37 of the third hydraulic valve 43 is associated with the first operating surface 19 of the third double acting cylinder 15. A second outlet 39 of the third hydraulic valve 43 is associated with the first operating surface 19 of the fourth double acting cylinder 17. The second partial transmission 27 can be controlled by the third hydraulic valve 43, together with the first hydraulic valve 33, and thus odd numbered gears of the dual clutch transmission 25 can be shifted.

Subsequently, shifting the gears 1 through 3 of the dual clutch transmission 25 is described in more detail. Thus, reference is made to the different shifting positions which were described above with respect to the first hydraulic valve 33, which apply identically also for the second hydraulic valve 41 and for the third hydraulic valve 43. The first shifting position is illustrated in FIG. 1 for the respective hydraulic valves 33, 41, and 43. On a left side of the first shifting position there is a respective center, or second, shifting position, and on the left side of the center shifting position there is a third shifting position.

In order to engage a first gear by means of the second partial transmission 27, the hydraulic valves 33, 41, 43 of the hydraulic arrangement 1 are shifted so that only the first operating surface 19 of the third double acting cylinder 15 is pressurized. All other operating surfaces are not pressurized or are connected with the tank 31 through the check valve 35. When the check valve 35 is subjected to an opening pressure, then the remaining operating surfaces are not unpressurized, but are loaded with the respective differential pressure between the tank 31 and the opening pressure. For engaging the first gear, wherein the first operating surface 19 of the third double acting cylinder 15 is pressurized, the third shift rail 7 moves to the right, as viewed in the orientation of FIG. 1. In order to facilitate that movement, the first hydraulic valve 33 is in the third shifting position, the second hydraulic valve 41 is in the second shifting position, and the third hydraulic valve 43 is in the third shifting position. It is apparent that the double acting cylinders 11, 13, and 17 are hydraulically short circuited and are connected by the second outlet 39 of the first hydraulic valve 33 with the tank 31. Only the first operating surface 19 of the third double acting cylinder 15 is connected through the first outlet 37 of the third hydraulic valve 43 and by the first outlet 37 of the first hydraulic valve 33 with the hydraulic energy source 29.

Advantageously, that connection cannot be performed directly, but through the first pressure return 45 with pressure- and/or volume-flow regulation. Advantageously, the first hydraulic valve 33 can be shifted by the first pressure return 45 so that the first hydraulic valve facilitates a pressure- and/or volume-flow regulation for engaging the first gear and possibly additional gears. The first pressure return 45 returns a pressure of the first outlet 37 to the first hydraulic valve 33.

Analogously to the first pressure return 45, the first hydraulic valve 33 includes a second pressure return 47, which returns a pressure of the second outlet 39 to the first hydraulic valve 33. Accordingly, the second outlet 39 can also be pressure and/or volume flow controlled. Advantageously, the first hydraulic valve 33 is configured as a double pressure and/or volume flow regulation valve.

As soon as the first gear is engaged, and the third shift rail 7 has been moved to the right as viewed in the orientation of FIG. 1, the first operating surface 19 of the third double acting cylinder 15 can be shifted without pressure, so that all operating surfaces 19, 21 of the dual clutch transmission 25 are not pressurized. Advantageously, the first gear also remains engaged in a non-pressurized condition. In order to facilitate this, the first hydraulic valve 33 is shifted into the second shifting position. Additionally, the third hydraulic valve 43 can also be moved into the second shifting position.

For engaging the second gear, an analogous procedure can be applied, wherein only the first pressure surface 19 of the first double acting cylinder 11 is pressurized. Thus, the first hydraulic valve 33 is moved into the third shifting position, the second hydraulic valve 41 is moved into the third shifting position, and the third hydraulic valve 43 is moved into the second shifting position. Thus, the first shift rail 3 of the first partial transmission 23, which is provided for shifting the even numbered gears, is moved to the right, as viewed in the orientation of FIG. 1. As soon as the second gear is engaged, and the first shift rail 3 is moved accordingly, all operating surfaces 19, 21 of the dual clutch transmission 25 can be unpressurized, wherein at least the first hydraulic valve 33, or, optionally, also the second and the third hydraulic valves 41, 43 are brought into the second shifting position.

For engaging the third gear, the third shift rail 7 has to be moved to the left, as viewed in the orientation of FIG. 1. Thus, initially the first double acting cylinder 11 and the second double acting cylinder 13 can be short circuited hydraulically, which is the case in the second shifting position of the second hydraulic valve 41. The third hydraulic valve 43 is brought into its third shifting position. Furthermore, the first hydraulic valve 33 is brought into the first shifting position, as illustrated in FIG. 1. Thus, the second outlet 39 is pressurized with the system pressure, controlled by the second pressure return 47. Thus, all second operating surfaces 21 of the double acting cylinders 11 through 17 connected downstream of the second outlet 39 of the first hydraulic valve 33 are pressurized with the system pressure. Furthermore, the first operating surfaces 19 of the first and second double acting cylinders 11, 13 are also pressurized with the shifting pressure by the second shifting position of the second hydraulic valve 41. Only the first operating surface 19 of the third double acting cylinder 15 is not pressurized with shifting pressure, and is associated through the first outlet 37 of the third hydraulic valve 43 and the first outlet 37 of the first hydraulic valve 33 by means of the check valve 35 with the non-pressurized tank 31. It is evident that the third shift rail 7, as viewed in the orientation of FIG. 1, thus moves to the left, which corresponds to engaging a third gear of the dual clutch transmission 25. As soon as the third gear is engaged, all operating surfaces 19, 21 of all double acting cylinders 11 by 17 can be switched to be unpressurized, wherein the hydraulic valves 33, 41, 43 can be moved into their center shifting positions.

Engagement of the remaining gears is performed analogously, so that reference is made to the description for the gears 1 through 3 for explanation.

In case all shift rails 3 through 9 are in a center position, which is illustrated in FIG. 1, the dual clutch transmission 25 is in an idle condition, that is, in a condition where no gear is shifted.

Figure 2:
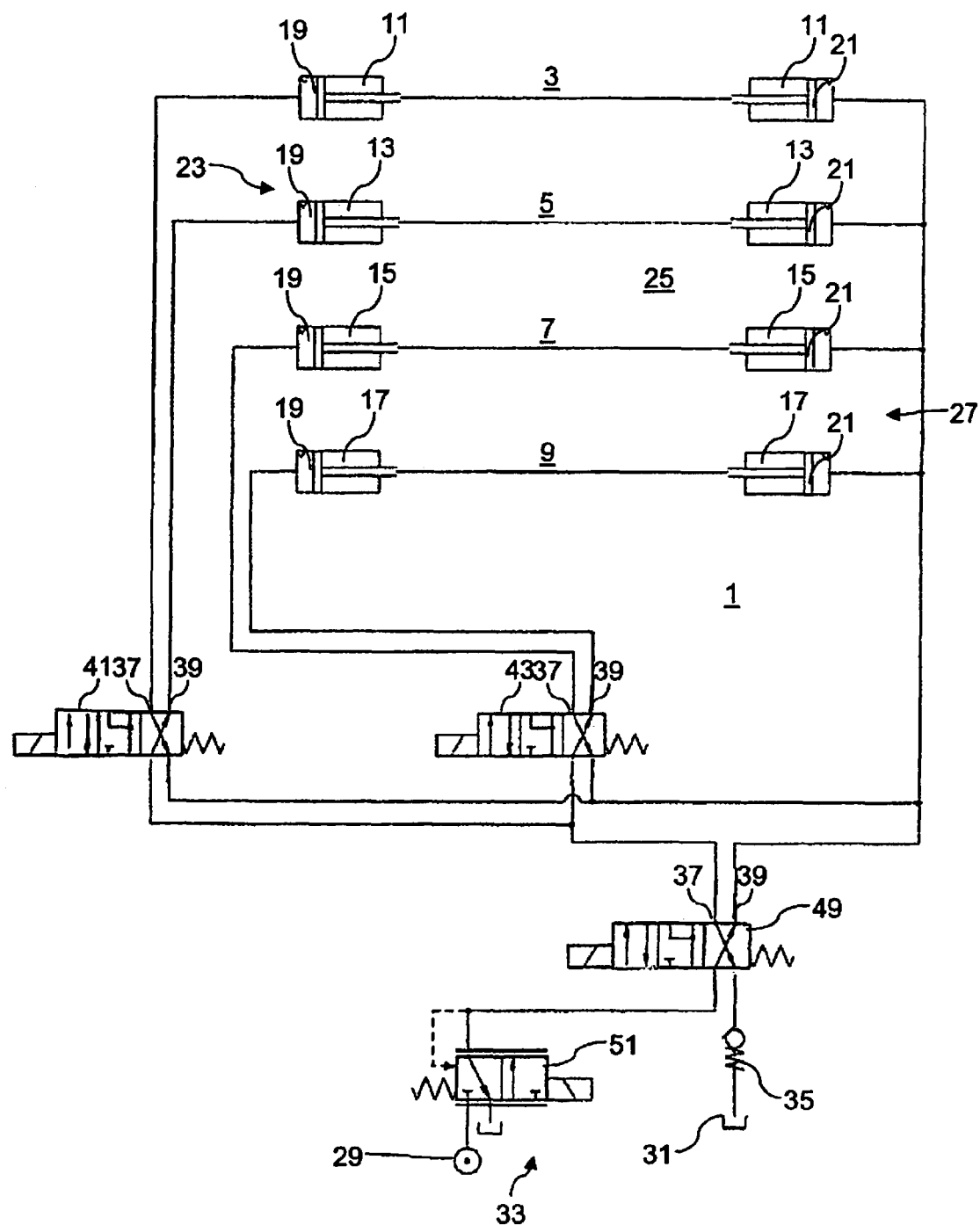
FIG. 2 shows a hydraulic arrangement analogous to the hydraulic arrangement illustrated in FIG. 1, wherein a separate pressure reducing and control valve is provided.

FIG. 2 illustrates another hydraulic arrangement 1, which is configured similar to the arrangement illustrated in FIG. 1. In this respect reference is made to the description of FIG. 1. As a sole difference, the first hydraulic valve 33 includes a simple switching valve 49, and is without pressure returns 45 and 47.

In order to still provide the shifting pressure required for engaging the gears of the dual clutch transmission 25, a pressure regulation and pressure reduction valve 51 is connected between the hydraulic energy source 29 and the switching valve 49 of the first hydraulic valve 33. The pressure regulation and pressure reduction valve 51 is configured as proportional valve with a pressure return, and can provide a regulated and reduced pressure.

According to the invention, the second operating surfaces 21 of the double acting cylinders 11 through 17 are arranged in pairs. Thus, the second operating surfaces 21 are connected with a common conduit and connected with the second outlet 39 of the first hydraulic valve 33. Advantageously, this facilitates reducing the number of valves. The second operating surfaces 21 can be configured so that they act in an identical direction, and thus they respectively move the shift rails 3 through 9 to the left in the orientation of FIGS. 1 and 2. The opposite first operating surfaces 19 can be advantageously controlled in pairs by the second hydraulic valve 41 and the third hydraulic valve 43, wherein shift rails that are respectively not being controlled can advantageously be hydraulically short circuited.

Advantageously, the second hydraulic valve 41 and the third hydraulic valve 43 can be respective simple switching valves, which are actuated electrically according to the invention and retracted by spring loading. By the first hydraulic valve 33 configured as a dual pressure regulator, the shifting pressures that are required for engaging gears can be provided. According to the embodiment of FIG. 2, the shifting pressures required for shifting can be provided by the pressure regulation and pressure reduction valve 51, and are accordingly conducted or switched over by a simple shifting valve that is the first hydraulic valve 33.

Advantageously, the entire control of the shift rails 3 through 9 is facilitated, according to the embodiment in FIG. 1, by only three valves, and according to the embodiment of FIG. 2 by only four valves. Advantageously, installation space and cost can be saved. The second operating surfaces 21, which are connected together, are either loaded with the shifting pressure by the first hydraulic valve 33, or connected to the tank 31 by the check valve 35. The check valve 35 thus prevents emptying the hydraulic conduits connected with the hydraulic operating surfaces 19, 21. For example, when a tank pressure of the tank 31 is applied to the connected operating surfaces by the first hydraulic valve 33, then a position change of one of the shift rails 3 through 9 can be provided by shift pressure loading of one of the opposite first operating surfaces 19 in one of the partial transmissions 23, 27. Each of the partial transmissions 23 and 27 is respectively associated with two of the shift rails 3 through 9, wherein the second hydraulic valve 41 or the third hydraulic valve 43 is respectively connected upstream of two respective shift rails. When the connected second operating surfaces 21 are loaded with the shifting pressure by the first hydraulic valve 33, then one of the first operating surfaces 19 can advantageously be connected with the tank pressure by the second hydraulic valve 41, or by the third hydraulic valve 43, wherein, advantageously, each of the accordingly switched double acting cylinders 11 through 17, or the associated shift rails 3 through 9, is movable to the left, relative to the orientation of FIGS. 1 and 2.

According to the embodiment of FIG. 2, the pressure regulation and pressure reduction valve 51 is connected between the hydraulic energy source 29, or a volume flow source, and the switching valve 49. This arrangement has the advantage that in a no-flow condition of the hydraulic valves 33, 41, 43, all hydraulic operating surfaces 19, 21 are at tank pressure level. Optionally, the check valve 35, also shown in FIG. 2, can be provided in a respective tank connection, wherein the check valve 35 can also prevent emptying the hydraulic conduits connected to the hydraulic operating surfaces 19, 21 by the pressure control and reduction valve 51.

According to the invention a hydraulic control of the shift rails 3 through 9, in particular of four shift rails, in particular of at least four shift rails of the dual clutch transmission 25 is provided, wherein each shift rail 3 through 9 has identically sized hydraulic operating surfaces 19 through 21. Advantageously, the control is provided by three valves with identical configurations of the hydraulic valves 33, 41, 43, and a corresponding hydraulic switching by means of the respective three shifting positions.

The second hydraulic operating surfaces 21, which respectively include an identical operating direction at the shift rails 3 through 9, are hydraulically joined. The opposite first operating surfaces 19 are controlled with a respective dedicated volume flow control valve, the second hydraulic valve 41 and the third hydraulic valve 43, and thus the shift rails of a partial transmission 23, 27 are respectively controlled with one valve. This means each of the partial transmissions 23 and 27 is associated with two of the shift rails 3 through 9 with a respective valve 41, 43.

Although particular embodiments of the present invention have been illustrated and described, it will be apparent to those skilled in the art that various changes and modifications can be made without departing from the spirit of the present invention. It is therefore intended to encompass within the appended claims all such changes and modifications that fall within the scope of the present invention.

What is claimed is:

1. A hydraulic arrangement by which a plurality of shift rails of a transmission are controllable, said hydraulic arrangement comprising:
   a source of hydraulic energy;
   a plurality of double acting cylinders connected with respective ones of a plurality of shift rails, by which cylinders respective ones of the shift rails are moved back and forth;
   a first hydraulic valve connected with the source of hydraulic energy and upstream of the plurality of double acting cylinders, wherein the first hydraulic valve includes a first inlet and a second inlet and a first outlet and a second outlet, through which first and second outlets a first shifting pressure and a second shifting pressure are selectively provided from the source of hydraulic energy to respective operating surfaces of the double acting cylinders for initiating movement of respective ones of the shift rails in a desired direction, wherein the first hydraulic valve includes a plurality of shifting positions, and at one shifting position the first hydraulic valve includes an internal crossover pattern between the first and second inlets and the first and second outlets;
   a second hydraulic valve connected between the first hydraulic valve and a first pair of the double acting cylinders for selectively moving respective ones of a first pair of shift rails, by which second hydraulic valve a first one of the first pair of double acting cylinders connected with a first one of the first pair of shift rails is connected with the first outlet of the first hydraulic valve, and a second one of the first pair of double acting cylinders and connected with a second one of the first pair of shift rails is connected with the second outlet of the first hydraulic valve in a crossover pattern, wherein the crossover pattern is provided internally within the second hydraulic valve; wherein the first and second hydraulic valves are three-position, four-way directional control valves.

2. The hydraulic arrangement according to claim 1, wherein the second outlet of the first hydraulic valve is connected through the second hydraulic valve with a first operating surface of the second one of the two double acting cylinders connected with a respective one of the first pair of shift rails, and is connected with a second operating surface of each of the first pair of double acting cylinders, wherein hydraulic pressure applied to the second operating surface acts on a respective double acting cylinder to move an associated shift rail in a first movement direction that is an opposite direction of shift rail movement from a shift rail movement direction provided by hydraulic pressure that is applied to the first operating surface of the second one of the two double acting cylinders connected with respective ones of the first pair of shift rails.

3. The hydraulic arrangement according to claim 2, wherein through connections with the second hydraulic valve both first operating surfaces of the first pair of double acting cylinders connected with respective ones of the first pair of shift rails are connected with the second outlet of the first hydraulic valve, and simultaneously both second operating surfaces of the first pair of double acting cylinders connected to respective ones of the first pair of shift rails are connected with the second outlet of the first hydraulic valve.

4. The hydraulic arrangement according to claim 3, including a third hydraulic valve that is connected as is the second hydraulic valve relative to the first hydraulic valve and is connected upstream of two respective double acting cylinders connected with respective ones of a second pair of shift rails; wherein the third hydraulic valve is a three-position, four-way directional control valve.

5. The hydraulic arrangement according to claim 4, wherein the first, the second, and the third hydraulic valves are each identically functionally configured.

6. The hydraulic arrangement according to claim 4, wherein each of the second operating surfaces of the double acting cylinders is connected with the first hydraulic valve by a common hydraulic conduit.

7. The hydraulic arrangement according to claim 4, wherein each of the first, the second, and the third hydraulic valves is a solenoid-operated valve.

8. The hydraulic arrangement according to claim 1, wherein the first hydraulic valve includes two respective pressure returns by which shift rail movement pressures are provided to respective ones of the double acting cylinders.

9. The hydraulic valve according to claim 1, wherein the first hydraulic valve is connected to a pressure regulation and reduction valve that is downstream of the hydraulic energy source, and the first hydraulic valve defines a switching valve connected downstream of the pressure regulation and reduction valve and through which hydraulic pressures for shifting respective shift rails are conveyed.

10. A dual clutch transmission including a hydraulic arrangement according to claim 1.

* * * * *